United States Patent [19]
Chiang

[11] Patent Number: 5,294,335
[45] Date of Patent: Mar. 15, 1994

[54] FILTER DEVICE FOR AQUARIUM TANKS OR ARTIFICIAL PONDS

[76] Inventor: Michael Chiang, No. 16, Lane 112, Sy Yuan Road, Shin Chung City, Taipei Hsien, Taiwan

[21] Appl. No.: 93,827

[22] Filed: Jul. 20, 1993

[51] Int. Cl.$^5$ ............................................. A01K 63/04
[52] U.S. Cl. ................................. 210/169; 210/232; 210/290; 210/284; 210/266; 210/416.2; 210/418; 210/436; 210/443; 210/472; 119/226; 119/259
[58] Field of Search ............... 210/169, 232, 266, 283, 210/284, 287, 290, 416.2, 418, 419, 436, 443, 472; 119/3, 5

[56] References Cited
U.S. PATENT DOCUMENTS

| | | | |
|---|---|---|---|
| 3,347,211 | 10/1967 | Falkenberg et al. | 119/5 |
| 3,371,789 | 3/1968 | Hense | 119/5 |
| 3,785,342 | 1/1974 | Rogers | 119/5 |
| 4,601,821 | 7/1986 | Sherman et al. | 119/5 |
| 4,895,646 | 1/1990 | Willinger | 119/5 |

Primary Examiner—Peter A. Hruskoci
Assistant Examiner—Robert James Popovics
Attorney, Agent, or Firm—Lowe, Price, LeBlanc & Becker

[57] ABSTRACT

An improved filtering device for aquarium tanks and artificial ponds mainly comprises a water injector which is made up of a top cover plate and a water injector base, a multi-layered filtering member and an external shield cup which is used to contain the filtering member with appropriate space wherein the edge of the top cover plate is made to be a thick edge which has an annular slot for an "O" shaped seal washer to be placed on. When the top cover plate and the external shield cup are put together, the thick edge is covered up inside the external shield cup, allowing the "O" shaped seal washer to seal off the internal rim of the external shield cup. The top cover plate further comprises a water inlet and a water discharge switch units connecting to the aquarium tank or the artificial pond, a movable lid which is located in a position corresponding to the top of the motor housing, an air discharge valve which corresponds to an air discharge trough of the injector base, a sealed motor chamber which forms with the top cover plate as a one piece body is located on the water injector base, attached to the sealed motor chamber are dual air discharge troughs, a main water inlet pipe and a main water discharge pipe.

7 Claims, 14 Drawing Sheets

FILTER DEVICE FOR AQUARIUM TANKS OR ARTIFICIAL PONDS

BACKGROUND OF THE INVENTION (a) Field of the Invention

The present invention relates to an improved structure of a filtering device for an aquarium tank or an artificial pond. More specifically, the present invention relates to a water filtering device having a structure with multi-layered filtering, water cooled motor, water inlet/outlet flow restriction device and a special device in which the contaminated air in the recirculated water can be discharged.

(b) Description of the Prior Ar

Water filtering devices for aquarium tanks are in general designed for small size tanks because the filtering volume is limited. In fact most of these filtering devices are merely processing the fish excretion and the waste foods in the tank. Theses useless material are being trapped in the filtering cartridges in the tank while the water is being circulated. This kind of filtering technique is inefficient and the water cannot be purified.

SUMMARY OF THE INVENTION

The main object according to the present invention is to provide a filtering device for used in an aquarium tank or an artificial pond such that it has a special feature in the treatment of contaminated water through a recirculation process.

Another object according to the present invention is to provide a filtering device which has a main and an auxiliary water inlet and discharge pipe, a water injector with dual air discharge troughs and a sealed motor chamber, and together with a filtering member so as to provide a more efficient filtering and air discharging.

A further object according to the present invention is to provide a multi-layered filtering member with a disk type diffusion plate such that water holes are located in the bottom of the diffusion plate. Dirty water are injected into an external shield cup and accumulates for the motor to draw up. Thus contaminated water can go through different layers of filtering materials to yield a good quality of purified water.

Still another object according to the present invention is to provide a filtering device in which both sides of the motor chamber have air discharging trough so that the contaminated air from the water purification process can be discharged.

Still another object according to the present invention is to provide a filtering device with an external shield cup to hold the filtering member. A plurality of clamping rings in the external shield cup are used to securely mount the cup and the top cover plate together.

A final object according to the present invention is to provide a filter with a flow restriction device such that the water inlet or discharge switch unit can either be opened or closed.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
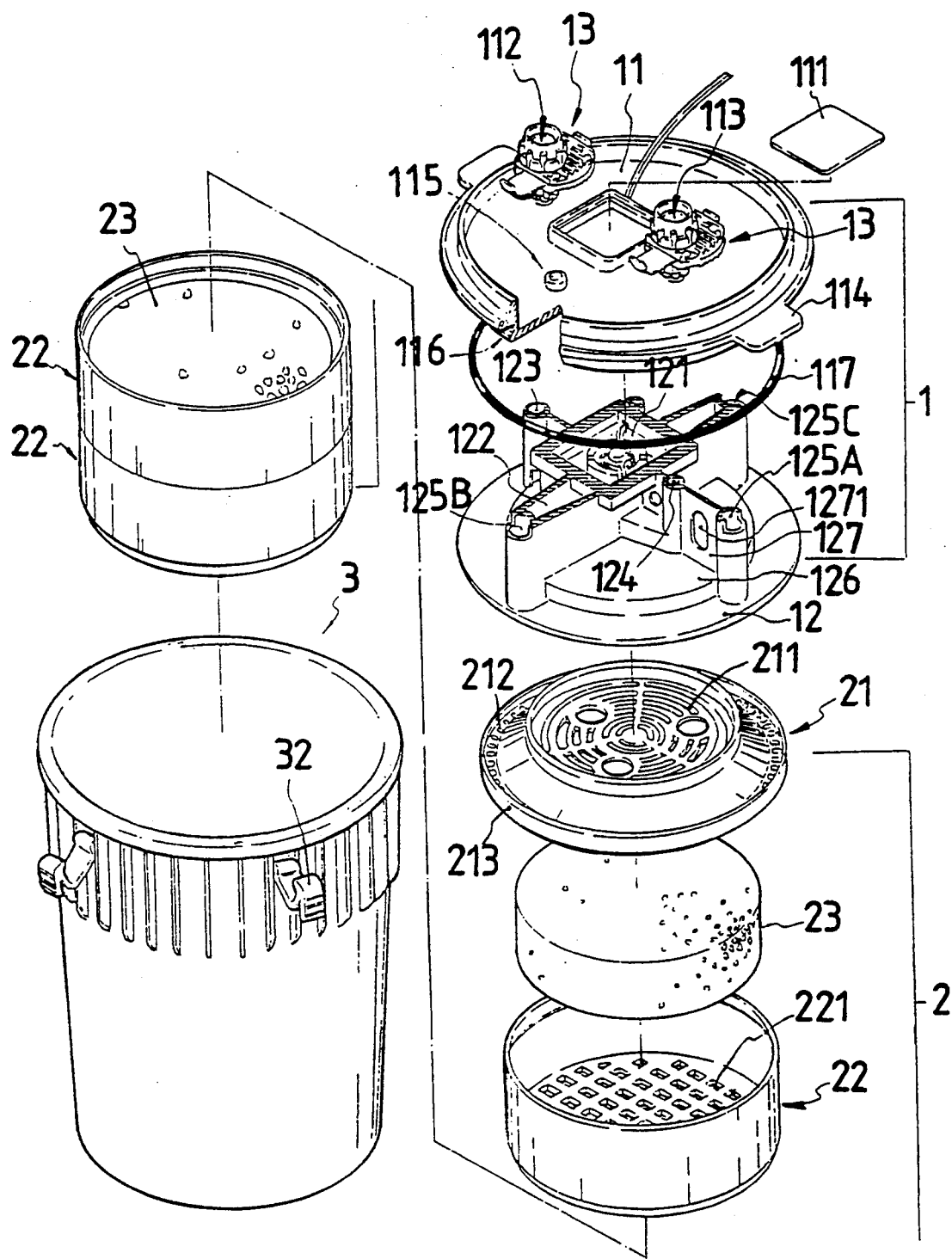
FIG. 1 is a perspective fragmented view of the filtering device for an aquarium tank or an artificial pond according to the present invention.
Figure 4:
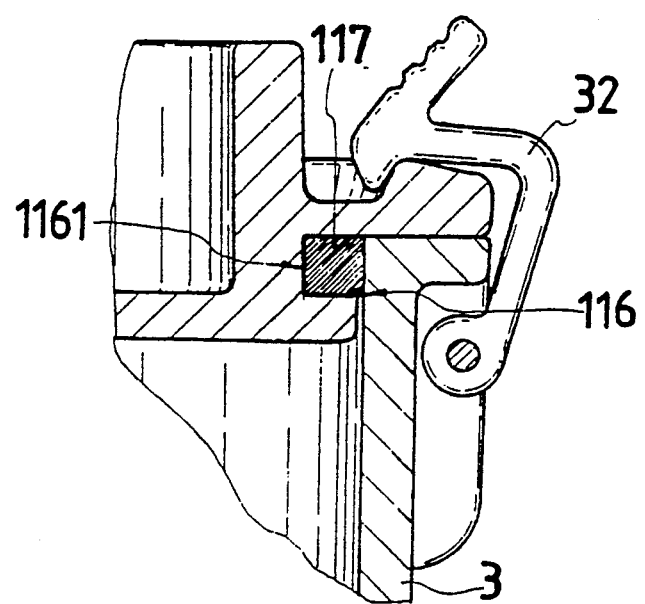
FIG. 4 shows the snug latching of the top cover plate and the external shield cup according to the present invention.
Figure 5:
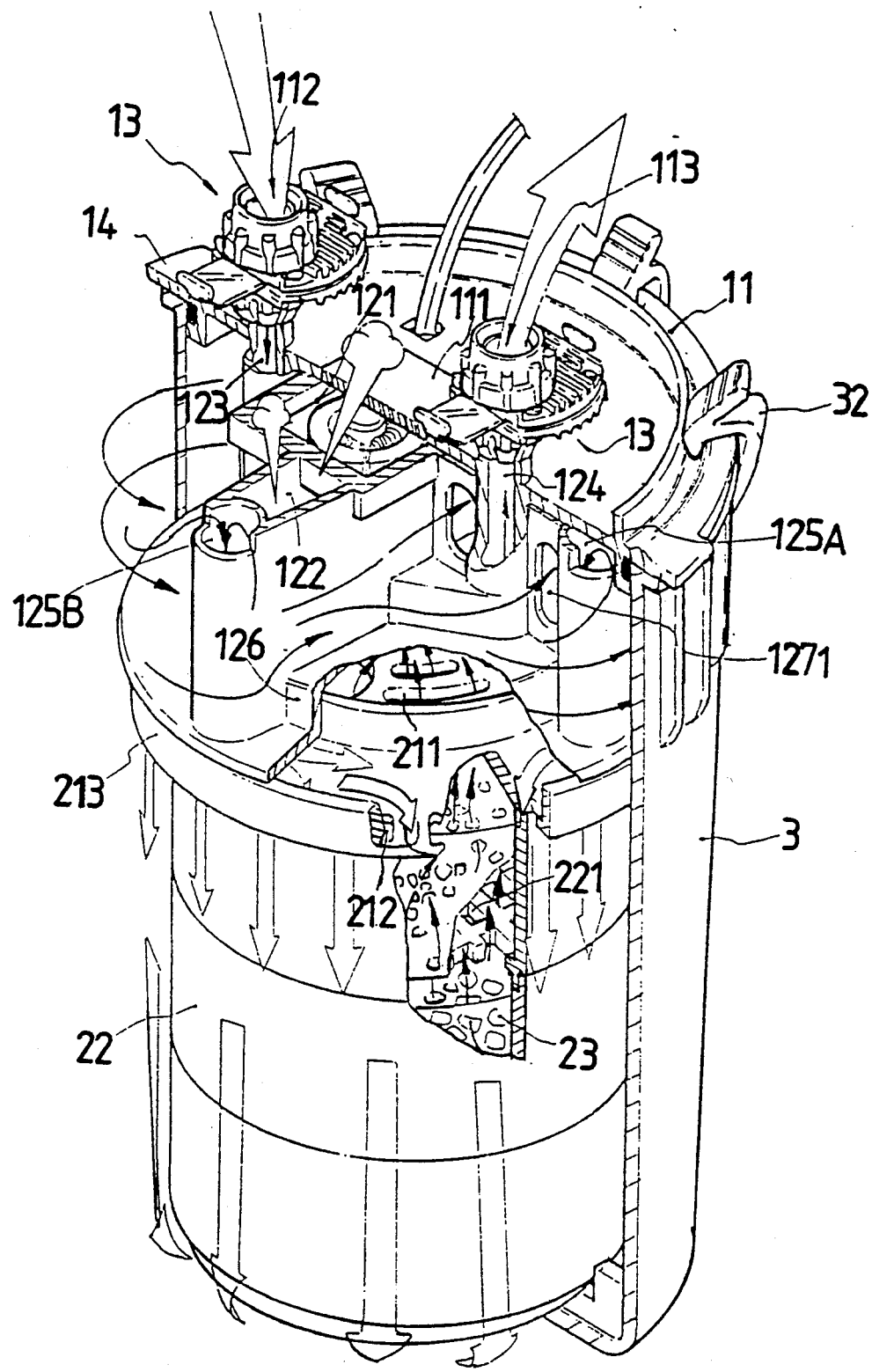
FIG. 5A is a partial cross section of the filtering device assembly according to the present invention.
FIG. 5B is a horizontal view of a diagrammatic of the filtering device during its operation according to the present invention.
Figure 5:
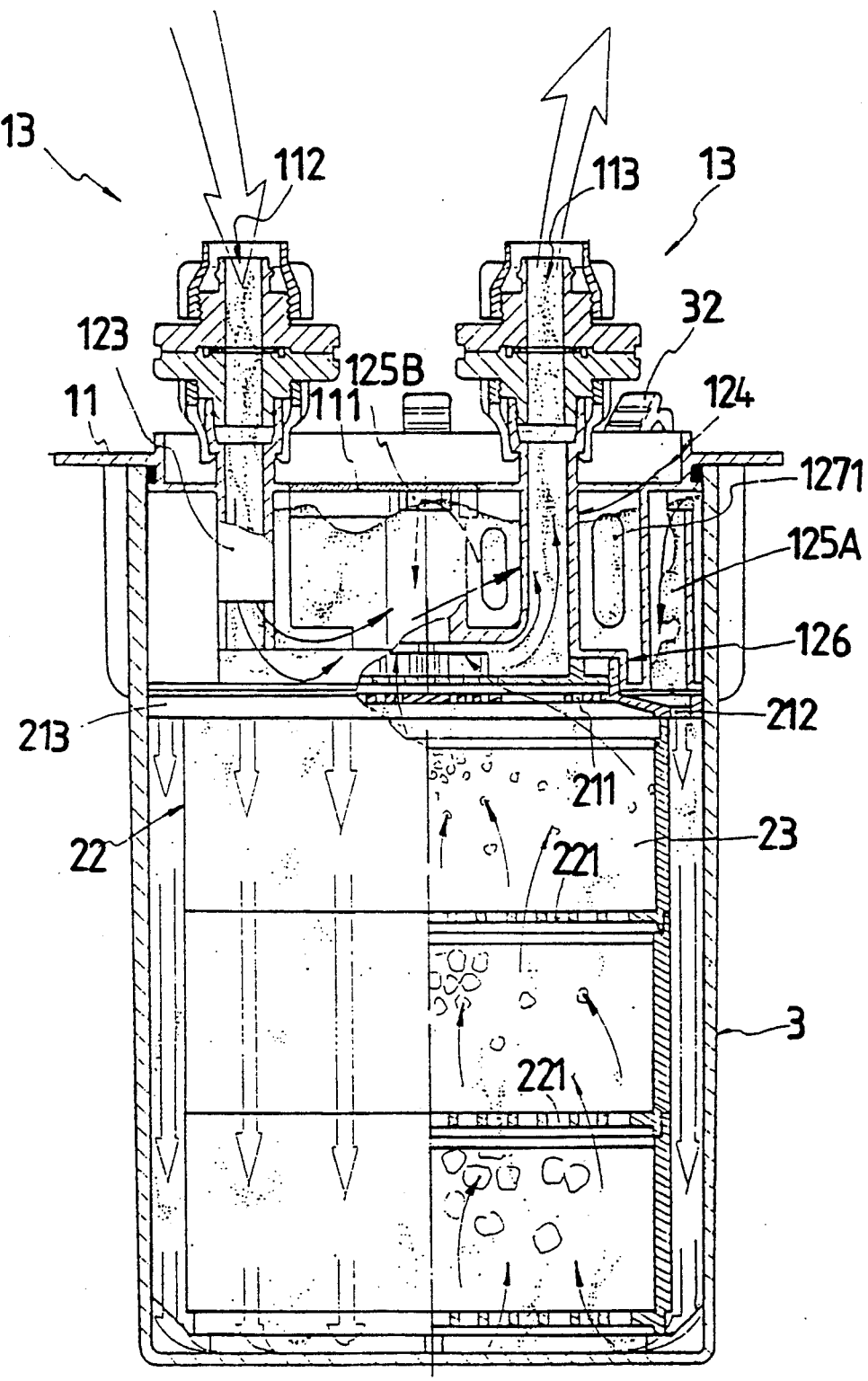

Referring to FIG. 1, the filtering device for an aquarium tank or an artificial pond according to the present invention mainly includes a water injector 1, a multi-layered filtering member 2 and an external shield cup 3. The water injector 1 is made up of a top cover plate 11 and a water injector base 12. The top cover plate 11 has a movable lid 111 which is located in a position corresponding to the top of the motor housing 121 of the water injector base. On one side of the movable lid 111 is a water inlet switch unit 112 which is used to inject unclean water, and on the other side of the movable lid 111 is a water discharge switch unit 113 which is used to discharge the purified water. Each of the water inlet/discharge switch unit 112 or 113 is connected is a flow restriction device 13 which is used to restrict the flow of water. Aligning with the extension line of the restriction devices 13 is an extension 114 projecting from the top cover plate. Also, on the other side of the movable lid 111 is a hand-operated air discharge valve 115. At the center of the water injector base is a motor chamber 121. Both sides of the motor chamber 121 and the side wall forms an air discharge trough 122 which is connected to auxiliary water inlet pipes 125B and 125C. Adjacent to a U-shaped projected portion 126 on the other side of the motor chamber 121 is an auxiliary water inlet pipe 125A. In the proximity of the motor chamber 121 and axially aligned with the auxiliary water inlet pipe 125A is a main water inlet pipe 123 and a main water discharge pipe 124. In between the axially aligned auxiliary water inlet pipe 125A, the main water inlet pipe 123, the main water is discharge pipe 124 and the motor chamber 121 is a rib wall 127 for supporting purpose. An appropriate amount of holes 1271 must be opened up for the flow of water. In addition, the edge of the top cover plate 11 is made to be a thick edge 116 which has an annular slot 1161 for an "O" shaped seal washer 117 to be placed on. When the top cover plate 11 and the external shield cup 3 are put together, the thick edge 116 is covered up inside the external shield cup 3, allowing the "O" shaped seal washer 117 to seal off the internal rim of the external shield cup 3. The multi-layered filtering member 2 is made up of a disk type diffusion plate 21 and a plurality of filtering materials 23 which are placed in the different layers of the filtering cup 22. The center of the top layer of the diffusion plate 21 is in a corresponding position with the U-shaped projecting portion 126 of the water injector base 12. Its internal are slotted holes 211 arranged in an annular shape. On the bottom of the diffusion plate 21 are water passage holes 212 of the edges and a plate wall 213 surrounding the diffusion plate 21. Such plate wall 213 provides a height to block the unpurified water from leaking out so that the unpurified water may flow into the water passage holes 212. The water pouring down through the water passage holes 212 ends up in the bottom of the external shield cup 3 from which the filtering cup 22 is fitted in and accumulate therein. Each layer of the filtering cup 22 has a plurality of water holes 221, the filtering material to be placed thereof varies from application to application. For instance, cotton can be used for filtering general contaminated water. Special metal or chemical contaminated water may need activated filter carbon granules, ion exchange resin or cotton as the filtering material. This kind of filtering material can also soften the water as well as increase its purity. The external shield cup 3, which is used to hold the multi-layered filtering member 2 and the water injector 1, has a plurality of clamping rings 32 so that the external shield cup 3 and the top cover plate 11 can be latched together after the filtering member 2 is placed therein, as is shown in FIG. 4. The assembled external shield cup 3 keeps a definite distance with the lowest layer filtering cup 22 of the filtering member 2, as is shown in FIG. 5, the partial cross section of the filtering device assembly.

Figure 2:
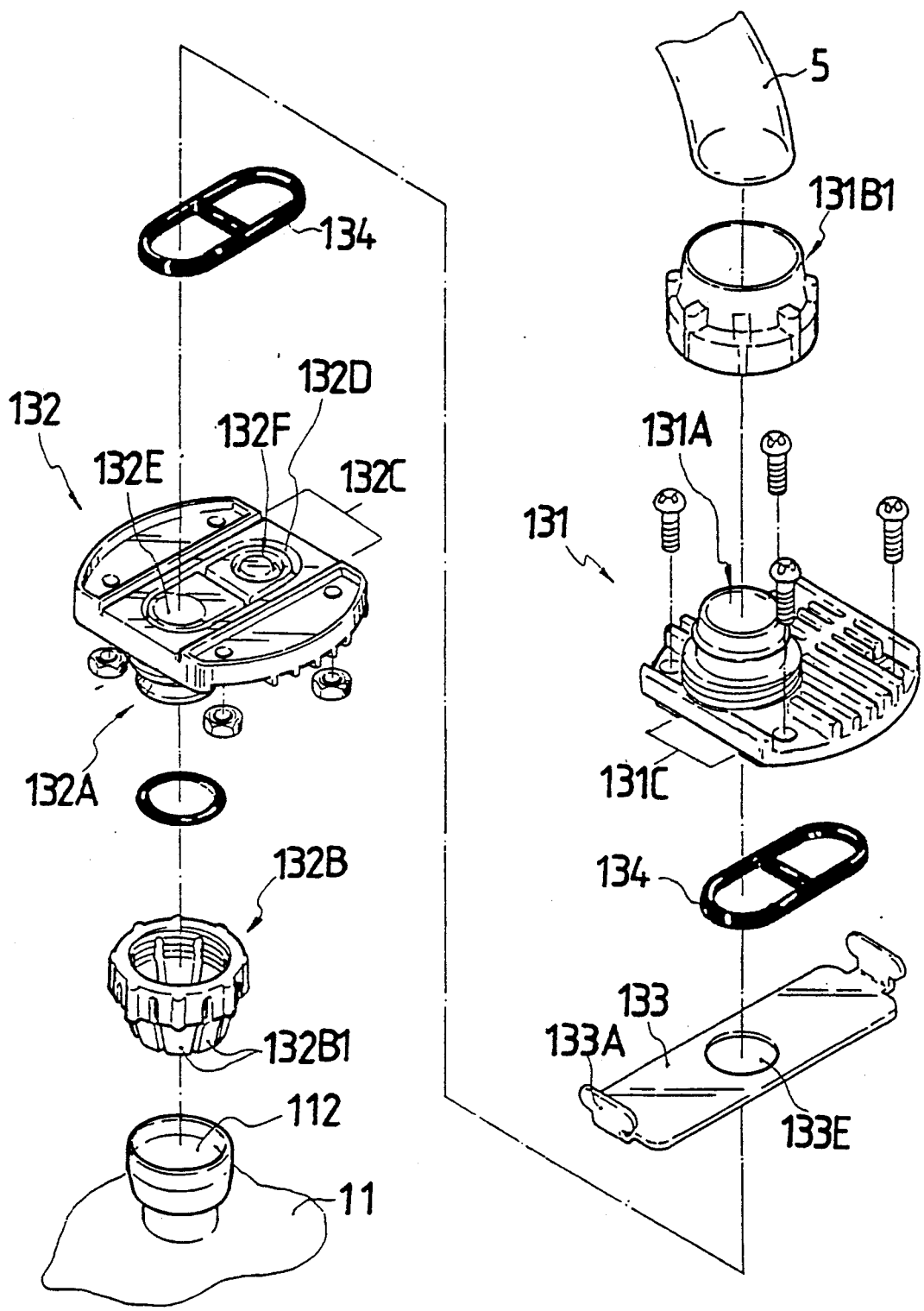
FIG. 2 is a perspective fragmented view of the flow restriction device for the water inlet/discharge according to the present invention.
Figure 3:
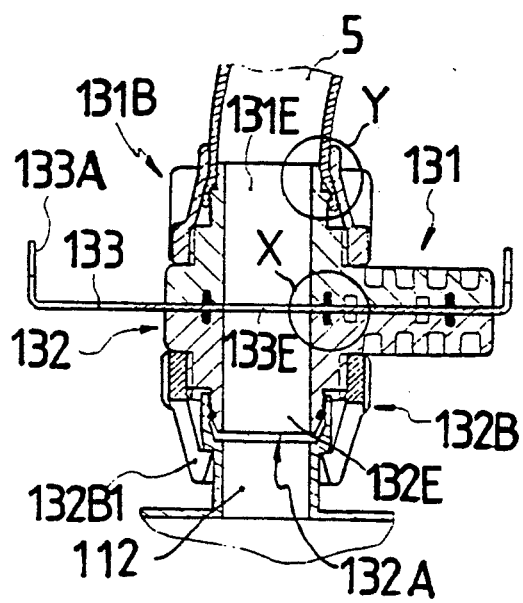
FIG. 3A shows the fully opened condition of the flow restriction device of the water inlet/discharge switch unit according to the present invention.
FIG. 3B shows the fully closed condition of the flow restriction device of the water inlet/discharge switch unit according to the present invention.
FIG. 3C shows the partial opening condition of the flow restriction device of the water inlet/discharge switch unit according to the present invention.
FIG. 3D is a vertical view of the detailed illustration of FIG. 3A.
FIG. 3E is a horizontal view of the detailed illustration of FIG. 3B.
Figure 3:
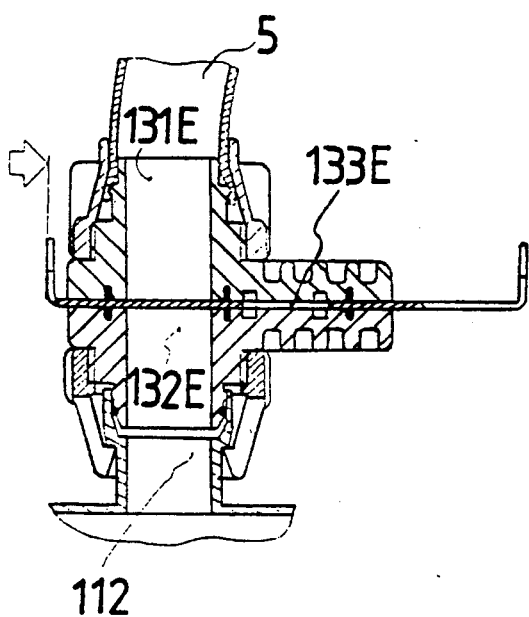
Figure 3:
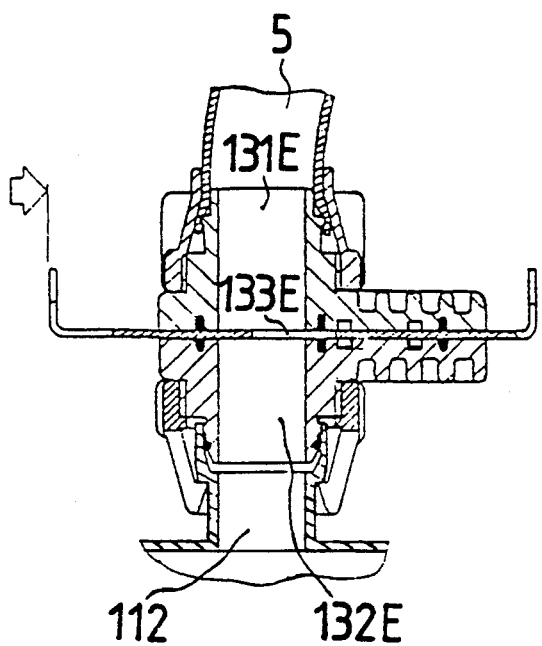
Figure 3:
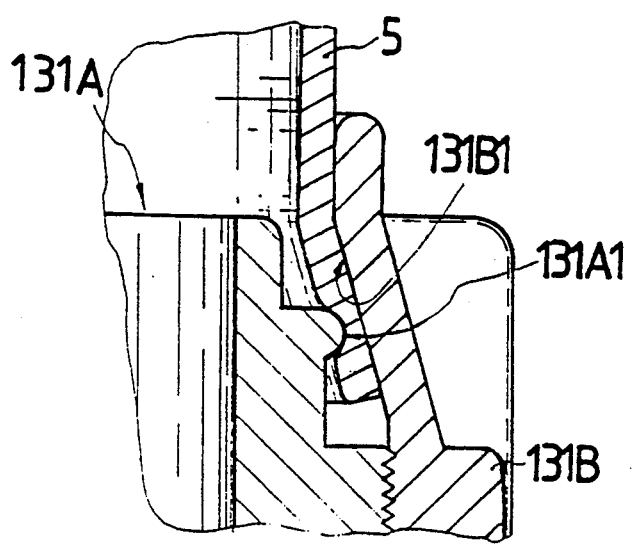
Figure 3:
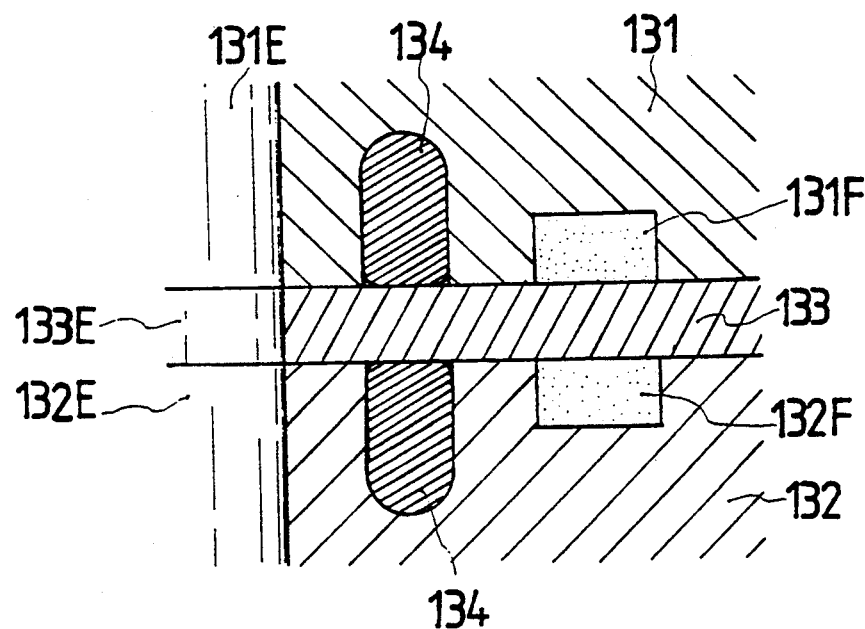

As mentioned in the aforesaid section, the water inlet and discharge switch units 112 and 113 are forming the flow restriction devices 13 as is shown in the perspective fragmented view in FIG. 2. Each of the flow restriction device includes a top plate 131, a bottom plate 132 and a push plate 133. The top of the top plate 131 has a coupling 131A and a nut cap 131B for external connection of a water pipe 5. The bottom plate 132 has a connector 132A thereunder, an adapter 132B is used to connect between the connector 132A and the water inlet switch unit 112 or the water discharge switch unit 113 by the use of screw threads. The top and the bottom is plates are bolted together by screws, the corresponding sides on the top and the bottom plates have wide slots 131C and 132C which are used for placing the push plate 133 for movement. The wide slots 131C and 132C have corresponding elongated channels 131D and 132D each one of these channels are for placing an elongated seal washer 134 therein. Each of the elongated opening inside the seal washers 134 has orifice holes 131E and 132E for water to pass through and annular troughs 131F and 132F. The push plate 133 has a flat shape with vertical catches 133A for fingers to grab. The center of the push plate 133 have holes 133E which have identical sizes as the orifice holes 131E and 132E. Accordingly, referring to FIG. 3, the push plate 133 is movable in between the top plate 131 and the bottom plate 132, allowing the holes 133E and the orifice holes 131E and 132E to be either fully opened as shown in FIG. 3A, fully closed as shown in FIG. 3B or partially opened as shown in FIG. 3C. This regulates the flow of water or limits the circulation. Referring to FIG. 3E for a horizontal view of the fully closed position of the flow restriction device, the elongated seal washers 134 are pushing the surface of the push plate 133 snugly and are preventing water from leaking. Since the top and the bottom surfaces of the push plate 133 are compressed by the elongated seal washers 134, the annular troughs 131F and 132F exist which are filled up with lubricants for lubricating both surfaces of the push plate 133, so as to get a smooth operation. It is shown in FIG. 3D that the coupling 131A and the nut cap 131B on the top plate 131 can be connected to an external water pipe 5. This is because the top of the coupling 131A has an annular flange 131A1 and the coupling 131B has a corresponding slanted wall 131B1 leaning inward. When the water pipe 5 is placed on the annular flange 131A1 and the nut cap is used to screw the coupling tightly. At this time the slanted wall 131B1 gradually moves to the annular flange 131A1, and finally the water pipe 5 is sealed off by the annular flange 131A1. Similarly, the water pipe 5 can be removed simply by loosening the nut cap 131B. Referring to FIG. 3A for the portion of the bottom plate 132 joining with the top cover plate 11. The connector 132A in the lower plate 132 has screw threads which are used to screw onto the inner threads of the adapter 132B. The front portion of the connector 132A has a seal washer so that the connector 132A can be connected to the water inlet switch unit 112 without leaking. If the lower plate 132 and the water inlet switch unit 112 are fitted together without screwing, the connection will not be secured. Therefore, the Inventor opens up equal-distance slots in the lower circumference of the adapter 132B and designs reverse hooks 132B1 such that each one of the reverse hook 132B1 is adjacent to one another. Accordingly, the adapter 132B can be loosely fitted with the water inlet switch unit 112, allowing it to fit with the screw threads of the connector 132A of the lower plate 132. Also, each of the reverse hooks can be hooked onto the edges of the water inlet switch unit 112. When the adapter 132B is turned in a clockwise direction, it forces the connector 132A of the lower plate to tighten up with the water inlet assembly. If the adapter 132B is turned in a counter-clockwise direction until it is completely loosen up, then the lower plate 132 can be easily taken apart with the water inlet switch unit 112.

Figure 7:
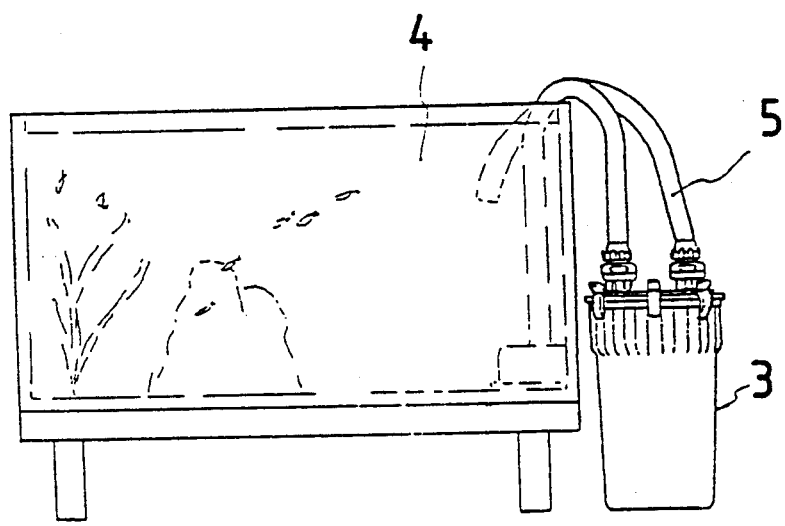
FIG. 7A is an embodiment of the filtering device used in an aquarium tank according to the present invention.
FIG. 7B is an embodiment of two filtering device connected in series to boost up the volume so as to be used in an artificial pond according to the present invention.
Figure 7:
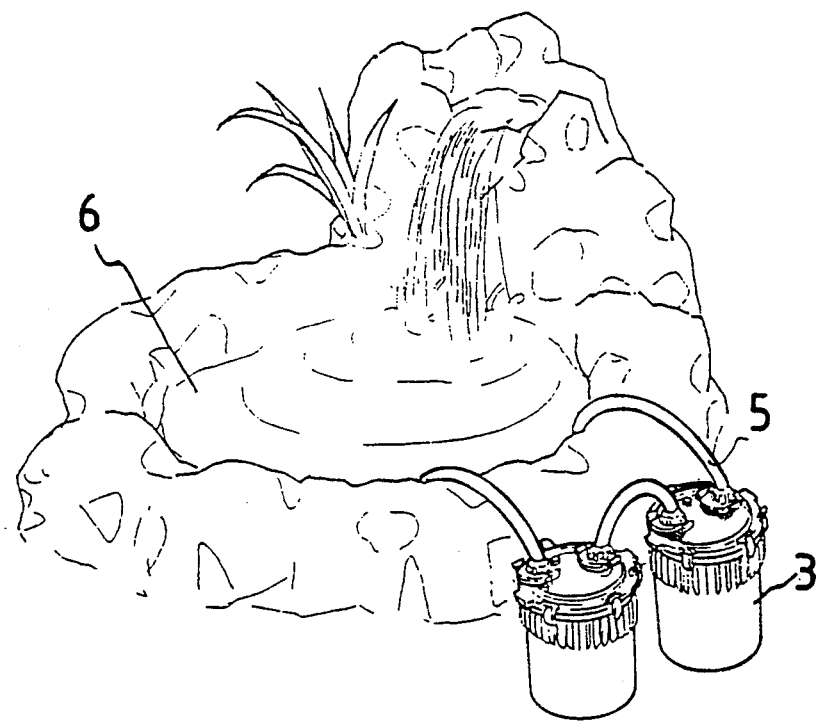

In the foregoing description of the filtering device, the dirty water to be filtered originates from the aquarium tank 4 or the artificial pond 6, as may be further described in the embodiment in FIGS. 7A and 72. It is shown in FIG. 7A that the water differential of a siphon can be applied to this embodiment. The dirty water can therefore be continuously fed into the guide tube of the filtering device. It is also shown in FIG. 7B that a pump is installed in the artificial pond 6 such that it pumps the dirty water into a plurality of series-connected filtering device according to the present invention. This expands the volume of the water to be filtered as well as increases the purification results.

Figure 6:
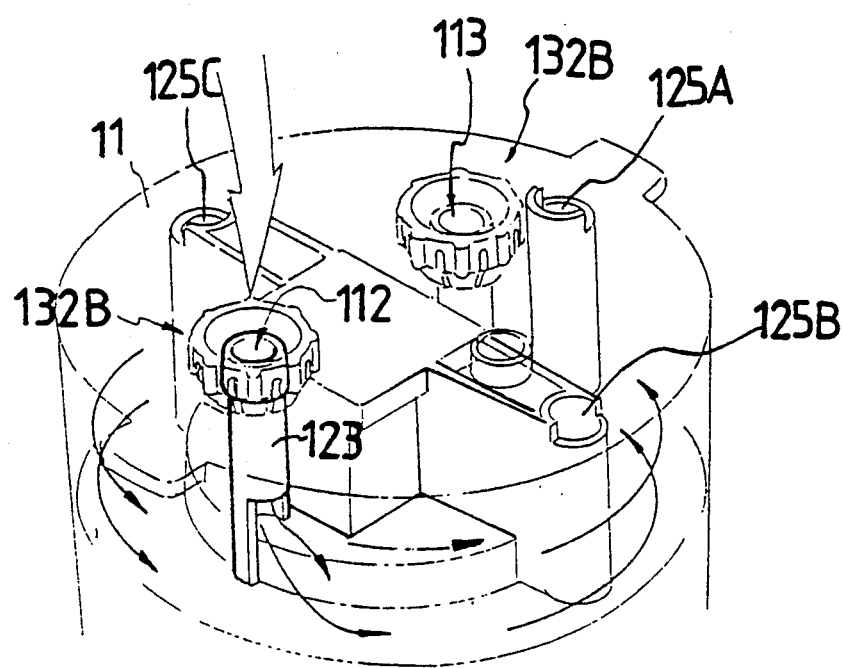
FIG. 6A is an illustrative drawing showing the dirty water being injected into the water injector for collection and recirculation.
FIG. 6B is an illustrative drawing showing the discharge of the pollute vapor generated from the water recirculation process.
Figure 6:
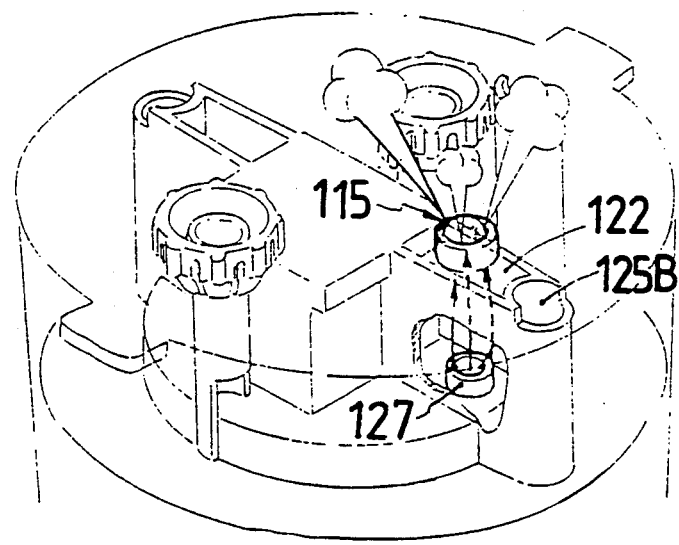

The dirty water as produced from the aquarium tank or the artificial pond first passes through the water inlet switch unit 112 and enters into the water injector 1. Similarly, the water discharge switch unit 113 passes the purified water through the external water pipe and circulates the purified water back into the tank or the pond. When dirty water enters the water injector base 12, since the main water inlet pipe 123 is not a feed through type but is a semi-guide tube which injects water into the injector base 12, as is shown in FIG. 6A. The external shield cup 3 functions as a water container and the injector base 12 provides the support of the bottom area. The dirty water then whirls inside this space and gradually accumulates so as to provide a water cooling effect for the motor. When the dirty water level exceeds the marked notches on the auxiliary water inlet pipes 125A, 125B and 125C, it leaks through these auxiliary pipes into the external shield cup 3, as can be seen from FIGS. 1, 5A and 5B. In addition, since the water injector 1 and the multi-layered filtering member 2 are fitted together through the different layers, the filtering device according to the present invention can be applied to a badly contaminated and large volume of water. In that case, the highly dense contaminated sediments are injected into the top of water injector base and the water that enters the auxiliary water inlet pipes 125A, 125B and 125C are closed to be purified and crystal clear. This prolongs the life of the filtering materials in the multi-layered filtering member 2 and extends the cleaning and service interval of the filtering member 2.

As discussed in the above embodiment, dirty water drains down to the external shield cup 3 and accumulates therein, water level rises gradually. The motor in the water injector base, 12 sucks up the dirty water through the water holes 221 of the multi-layered filtering of the cups 22. Thus, dirty water are filtered through the cups 22 by the filtering materials 23. The filtering materials 23 are preferably cotton, activated carbon granules or ion exchange resins. These filtering materials can be used individually or can be a combination. If cottons are used as the filtering material, they shall be placed in a pattern such that the lowest layer of the cotton are thinly scattered and the highest layer are densely packed. This kind of arrangement provides the best possible purified and clear water. The impurity gas, such as carbon dioxide, generates from the purification and filtering process is then carried up in the form of air bubbles. These air bubbles discharges through the air discharge troughs 122. When the contaminated air is being discharged, the water injector base 12 are connected with the top cover plate 11, therefore, another discharging hole is designed on the top cover plate. In order to measure the contaminated air left in the water, the volume of filtering and the purity of the filtering materials, an audible air discharge valve 115 is installed. Based on the movement of the valve and the audible frequency it generates, the above parameters can be obtained. In order to expedite the discharging, an air tube 127 is added between the air discharge valve 115 and the first air discharge trough 122; a second air discharge trough is located on the opposite side of the motor housing 121. The purified water generated from the discharging of the contaminated air passes through the water discharge pipe 124, the water discharge switch unit 113, the external water pipes and circulates back into the aquarium tank and the artificial pond.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. An improved filtering device for an aquarium tank or an artificial pond mainly comprises:
    a water injector which is made up of a top cover plate and a water injector base;
    a multi-layered filtering member filled with filtering materials; and
    an external shield cup which is used to contain the filtering member; wherein:
    the top cover plate further comprises a water inlet switch unit and a water discharge switch unit for connection to the aquarium tank or artificial pond, a movable lid which is located on said top cover plate in a position above a motor housing, an air discharge valve in fluid communication with a first air discharge trough on the water injector base, a sealed motor chamber which forms with the top cover plate a one piece body which is located on the water injector base, attached to the sealed motor chamber is said first air discharge trough, a second air discharge trough, a main water inlet pipe and a main water discharge pipe, adjacent to the motor chamber are three auxiliary water inlet pipes having marked notches, in addition, the edge of the top cover plate has an annular slot for an "O" shaped seal washer to be placed in, when the top cover plate and the external shield cup are put together, the edge is covered up inside the external shield cup, allowing the "O" shaped seal washer to seal of an internal rim of the external shield cup; the multi-layered filtering member is made up of a diffusion plate and a plurality of filtering materials which are placed in different layers in a filtering cup, the center of the top layer of the diffusion plate is in a corresponding position with a U-shaped projecting portion of the water injector base having slotted holes arranged in an annular manner, on the bottom of the diffusion plate are water passage holes at the edges and a plate wall surrounding the diffusion plate.

2. A filtering device for an aquarium tank or an artificial pond as recited in claim 1 wherein a flow restriction device is added to said water inlet switch unit or water discharge switch unit, each of the flow restriction devices comprises a top plate, a bottom plate and a push plate in which:
    the top of the top plate has a coupling and a nut cap which can be screwed onto the coupling, the top of the coupling has an annular flange and the coupling has a slanted wall leaning inward, when the water pipe is placed on the annular flange, the tightening of the coupling and the nut cap allows the slanted wall to move to the annular flange gradually, this effectively seals off the leaking of water, to disconnect the water pipe, the nut cap needs to be loosened up and the slanted wall will no longer compress against the water pipe;

the bottom of the bottom plate has a connector and an adapter which can be screwed onto the connector, the front portion of the connector has a seal washer so that the connector can be connected to the water inlet switch unit without any leak, also, equal-distance slots in the lower circumference of the adapter and reverse hooks are incorporated with each one of the reverse hooks being adjacent to another, accordingly, the adapter can be loosely fitted with the water inlet switch unit, allowing it to fit with the screw threads of the connector of the bottom plate, also, each of the reverse hooks can be hooked onto the edges of the water inlet switch unit, when the adapter is turned in a clockwise direction, it forces the connector of the lower plate to tighten up with the water inlet assembly, if the adapter is turned in a counter-clockwise direction until it is completely loose, then the lower plate can be easily detached from the water inlet switch unit;

the top and the bottom plates are bolted together by screws, the corresponding sides on the top and the bottom plates have wide slots which are used to place the push plate for movement, the wide slots have corresponding elongated channels for placing a seal washer therein, each of the elongated openings inside the seal washers have orifice holes and annular troughs, the push plate has a flat shape with vertical catches for the hands to grab, the center of the push plates have holes which are identical in sizes to the orifice holes, accordingly, the push plate is movable in between the top plate and the bottom plate, allowing the holes and the orifice holes to be either fully opened, fully closed or partially opened, thereby regulating the flow of water or limiting the circulation, in addition, the annular troughs are filled with lubricants for both surfaces of the push plate to operate smoothly.

3. A filtering device for an aquarium tank or an artificial pond as recited in claim 1 wherein the main water inlet pipe has a notch cutout in the bottom and the three auxiliary water inlet pipes are installed lower than the motor chamber and its extended side wall.

4. A filtering device for an aquarium tank or an artificial pond as recited in claim 1 wherein an auxiliary water inlet pipe, the main water inlet pipe, the main water discharge pipe and the motor chamber are all axially aligned with a rib wall between them for supporting purpose, said rib wall having holes therein for the flow of water.

5. A filtering device for an aquarium tank or an artificial pond as recited in claim 1 wherein the connecting surface between the central top layer of the diffusion plate and its bottom layer is a slanted surface.

6. A filtering device for an aquarium tank or an artificial pond as recited in claim 1 wherein the multi-layered filtering member has a plurality filtering cups connected together to hold the filtering materials, also, the bottom of each filtering cups has a plurality of holes; the filtering material can either be cotton, activated carbon granules or ion exchange resins, these filtering materials can either be used individually or combined with each other.

7. A filtering device for an aquarium tank or an artificial pond as recited in claim 1 wherein the external shield cup has a plurality of clamping rings in its upper rim so that it can be latched together with the top cover plate to prevent water from leaking.

* * * * *